(12) United States Patent
Friedrich

(10) Patent No.: US 10,965,343 B1
(45) Date of Patent: Mar. 30, 2021

(54) SIGNAL ANALYZER AND METHOD FOR ANALYZING SIGNALS

(71) Applicant: Rohde & Schwarz GmbH & Co. KG, Munich (DE)

(72) Inventor: Paul Friedrich, Chemnitz (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 0 days.

(21) Appl. No.: 16/693,786

(22) Filed: Nov. 25, 2019

(51) Int. Cl.
H04B 3/32 (2006.01)
H04B 3/54 (2006.01)
H04B 3/46 (2015.01)

(52) U.S. Cl.
CPC .............. H04B 3/542 (2013.01); H04B 3/32 (2013.01); H04B 3/46 (2013.01)

(58) Field of Classification Search
CPC . H04B 1/707; H04B 3/32; H04B 3/46; H04B 3/487; H04B 17/00; H04L 12/26; H04L 25/03; H04L 27/28; H04L 43/087; H04M 1/02; H04M 9/08
USPC ....... 375/219, 224, 227, 295, 296, 346, 348, 375/354; 455/67.11, 296; 702/66, 79, 702/176, 193
See application file for complete search history.

(56) References Cited

U.S. PATENT DOCUMENTS

| | | | |
|---|---|---|---|
| 8,386,857 B2* | 2/2013 | Tran | H04L 1/244 714/704 |
| 10,200,085 B1 | 2/2019 | Gines et al. | |
| 2006/0245484 A1 | 11/2006 | Calvin et al. | |
| 2019/0208112 A1* | 7/2019 | Kleinbeck | G01S 3/00 |

* cited by examiner

*Primary Examiner* — Shawkat M Ali
(74) *Attorney, Agent, or Firm* — Westman, Champlin & Koehler, P.A.

(57) ABSTRACT

An analyzer and a method for analyzing a signal, in particular a signal for transmitting data is provided. For analyzing the signal transmission and detecting a specific error, a data signal may be received and analyzed in order to detect one or more types of errors according to predetermined specifications. When such a predetermined error is detected, the signal for transmitting the data and one or more further signals, which may cause the error are acquired. Accordingly, a cause of failure may be easily analyzed based on the acquired signal sequences of the signal for transmitting the data and the additionally acquired signals.

24 Claims, 3 Drawing Sheets

SIGNAL ANALYZER AND METHOD FOR ANALYZING SIGNALS

TECHNICAL FIELD

The present invention relates to a signal analyzer and a method for analyzing signals. In particular, the present invention relates to an analysis of signals, wherein a signal causes an error in a further signal.

RELATED ART

Although applicable in principle to any kind of signal, the present invention and its underlying problem will be hereinafter described in connection with a data transmission over a serial transmission line.

Many systems and devices require a data transmission between individual units. For example, computer systems require a data transmission between a processing unit and one or more hard disk drives, network systems perform data transmission by means of networks such as Ethernet, or sensors may provide sensor data to a processing device by means of a data communication. However, in any case of data communication there may be a plurality of impacts causing an error in the data transmission.

Thus, communication links have to be tested in order to en-sure a reliable data communication and to identify sources of failures. However, due to the complexity of modern electronic systems, it might be difficult to identify a correct source of failure in some cases. In particular, if a specific failure occurs only rarely, it is difficult to identify the correct impact causing such a failure.

Against this background, a problem addressed by the present invention is to provide an apparatus and a method for analyzing signals causing specific errors. In particular, the present invention aims to provide an apparatus and a method for analyzing further signals causing an error in a specific signal.

SUMMARY

The present invention solves this problem by a signal analyzer and a method for analyzing signals with the features of the independent claims. Further advantageous embodiments are subject-matter of the dependent claims.

According to a first aspect, a signal analyzer is provided. The signal analyzer comprises a first input, a second input, an acquisition device, a digitizer, a decoder and an error detector. The first input is configured to receive a first signal, and the second input is configured to receive a second signal. The acquisition device is configured to acquire a signal sequence of the received first signal. The digitizer is configured to digitize the received first signal. Further, the digitizer may digitize the received second signal. The decoder is configured to decode the digitized first signal.

The error detector is configured to detect a predetermined error in the received first signal. Additionally, or alternatively, the error detector may detect a predetermined error in the decoded digitized first signal. In particular, the signal acquisition of the acquisition device is triggered based on the detection of a specific predetermined error in the error detector.

According to a second aspect, a method for analyzing signals is provided. The method comprises receiving a first signal and receiving a second signal. The first signal may be received by a first input, and the second signal may be received by a second input. The method further comprises acquiring a signal sequence of the received first signal. Further, the method may comprise acquiring a signal sequence of the received second input. The acquisition of the signal sequences may be performed by an acquisition device. Further, the method comprises digitizing the received first signal.

The digitizing of the signals may be performed by a digitizer. Further, the method comprises decoding the digitized first signal. The decoding may be performed by a decoder. Finally, the method comprises detecting a predetermined error in the received first signal. Additionally, or alternatively, the method may comprise detecting a predetermined error in the decoded digitized first signal. The detection of the error may be performed by an error detector. In particular, the acquisition of the signals is triggered based on the detection of a specific predetermined error.

The present invention is based on the finding that an error in a signal, in particular an error in a signal which may be used for transmitting data, may be caused, for example, by one or more further signals, which may have impact to the affected signal. For example, an amplitude or a signal waveform may be influenced by cross talk. Further, any other effects may have impact to a signal transmitted via a specific transmission path. For example, electric, magnetic or electromagnetic fields may also have impact to a transmitted signal. In case that an impact for causing an error in a transmitted signal occurs only rarely, it may be difficult to identify the real source of failure for such an error. Especially, if other types of failures may occur more often than a specific rare failure, it may be not appropriate to perform a recording of signals each time when an arbitrary failure occurs.

The present invention takes into account this finding and aims to provide an improved signal analysis in order to achieve an efficient identification of the source of failure for a specific error. It is for this purpose, that a specific error may be specified in detail, and a data acquisition of the erroneous signal together with a signal acquisition of one or more additional signals, which may cause the respective error is performed in case that the specific error is detected.

In this way, it is possible to limit the data acquisition only to an acquisition of signals in a time period when a specified error occurs. Furthermore, by acquiring not only the affected signal, but also one or more further signals, which may cause the specified error, it is possible to evaluate the related further signals for identifying a source of failure for the related error. In this way, the trouble shooting for a specific error, in particular a specific error, which may only occurs very rarely, is improved. Especially, a user may focus on signals, which have been acquired in relation with the specific error. Hence, a source of failure can be easily identified and consequently, the affected system can be improved by eliminating or at least reducing the identified source of failure.

The first input may be any kind of input for receiving a specific signal, in particular a data signal. For this purpose, the first input may provide an appropriate terminal such as a connector for connecting the terminal with one or more wires of a cable. For example, the data signal received by the first input may be transmitted by a single wire providing a signal with respect to ground. Alternatively, a differential signal may be provided by a differential voltage between two wires. However, it may be also possible to transmit data by means of a parallel interface using multiple signal lines in parallel. In such a case, the first input may be connected to one of these signal lines or to all of these signal lines in parallel. It may be also possible to analyze signals of a wireless data transmission. In this case, the first input may comprise an appropriate element such as an antenna or the like for receiving the respective wireless signal.

The first input may comprise further elements such as an amplifier, an attenuator, filter elements or the like for adapting the properties of the received signal.

The second input may receive one or more further signals, in particular further signals, which are related to the first signal. For example, the second input may receive a signal, which is transmitted by a further wire of a cable which comprises a wire for transmitting the first signal. In particular, the further signal may be a signal of a wire, which is parallel to a wire for transmitting the first signal. However, any other kind of second signal may be also received. For example, the second signal may relate to a further signal output by a device, which transmits the first signal. Alternatively, the second signal may be a signal, which is provided to the device transmitting the first signal. However, the second signal is not limited to the above-mentioned examples.

Furthermore, any kind of second signal may be possible, in particular any kind of signal, which may interfere with the first signal. In particular, the second signal may be a signal transmitted by a wire or a wireless signal.

Accordingly, the second input may comprise an appropriate terminal for receiving the one or more second signals. As already mentioned above in connection with the first input, the second input may comprise terminals for receiving one or more wires or for connecting an antenna. Furthermore, the second input also may comprise an attenuator, an amplifier, filter elements or any other elements for adapting the receiving second signal.

The received first signal is further processed and analyzed in order to identify specific errors. For this purpose, the received first signal may be digitized. For example, a level of the received signal may be compared with one or more threshold values in order to determine, whether a voltage level of the received signal relates to a high level (i.e. a logical one) or a low level (i.e. a logical zero). However, it is understood, that any other kind of digitizing of the received signal may be also possible.

Next, the digitized first signal may be provided to a decoder for decoding the digitized first signal. For example, the sequence of the logical high and low values may be decoded in order to extract encoded data. In particular, a specific protocol may be taken into account for decoding the first signal. For example, the digitized signal may be separated into predetermined blocks. Furthermore, a header may be identified and extracted, or any other kind of decoding operation may be performed.

The received first signal and/or the decoded first signal may be evaluated by the error detector in order to identify a predetermined error. In particular, the predetermined error may be specified in advance. For this purpose, specific threshold values or tolerance levels may be defined. For example, it may be possible to define voltage levels of the first signal. In particular, it may be possible to define an upper and/or lower voltage for a logic low and an upper and/or lower voltage level for a logical high signal. It may be also possible to define specific parameters for the rising/falling edges of the first signal, a signal-to-noise ratio, specific timing requirements or any other parameter, which has to be fulfilled by the received first signal. Furthermore, it may be possible to evaluate a checksum, one or more parity bits or any other kind of bit error in the decoded signal. In addition, any other requirements with respect to the decoded signal, such as requirements regarding to a specific protocol or the like may be evaluated. Based on the assessment of the received first signal and/or the decoded first signal, one or more types of errors may be detected. Accordingly, an indication may be provided by the error detector when an error has been detected, i.e. the specified requirements are not fulfilled.

When a predetermined error is detected in the first signal or the decoded first signal, a signal sequence of the received first signal and the received second signal may be acquired. In other words, a detection of a predetermined error by the error detector may trigger a signal acquisition of the first signal and the second signal. For example, signal sequences of the first and the second signal for a predetermined period of time may be recorded, when a predetermined error is detected. In particular, the recorded signal sequences may relate to a specific period of time before the error has been detected. For this purpose, the first and the second signal may be continuously stored in a memory, for example a cyclic memory. When an error is detected in the first signal or the decoded first signal, the recording may immediately stop, or the recording may stop after a predetermined period of time. Alternatively, it may be also possible to generate an indication for specifying the position in the recorded signals when the error has been detected. In this way, it is possible to analyze not only the first signal and the related error in the first signal, but also the second signal. Accordingly, effects of the second signal, which may cause the error in the first signal or the decoded first signal may be identified.

Furthermore, it may be possible to store a specification for indicating the type of the detected error or any further information with respect to the identified error together with the acquired signals.

Further embodiments of the present invention are subject of the further sub-claims and of the following description, referring to the drawings.

In a possible embodiment of the signal analyzer, the predetermined errors comprise at least one of a protocol error, a bit error, a timing error and an error level of the received first signal or the decoded digitized first signal.

In general, the error detector may detect any kind of errors in the received first signal or in the processed first signal. For example, the error detector may analyze the received first signal, in particular a voltage of the received first signal, in order to determine whether or not a level of the received first signal is within a specified range. For example, a lower and/or upper threshold may be defined. In particular, lower/upper thresholds may be defined for a logical low and a logical high. However, the error detector may also apply any other kind of thresholds for determining, whether or not the received first signal fulfills one or more predetermined conditions.

Furthermore, a rising or falling edge of the received first signal may be analyzed, a signal-to-noise ratio of the received first signal may be determined and compared with predetermined requirements, or any other property of the received first signal may be analyzed and compared with predetermined specifications.

Furthermore, the encoded data of the received first signal may comprise one or more parity bits or a checksum. In such a case, the error detector may verify whether or not the parity bits or the checksum is correct. The error detector may also verify any other property in the encoded data. For example, a header of data sequence may be analyzed, or it may be determined whether any other segment of the received data fulfills predetermined requirements.

Furthermore, the error detector may verify whether a timing of the received first signal is correct. For example, the error detector may analyze a timing, in particular a period of time, when a signal level of the received first signal changes from low to high or from high to low. However, it is understood, that any other property of the received first signal or the encoded first signal may be also analyzed in order to determined whether or not predetermined requirements are fulfilled.

In particular, the predetermined requirements may be requirements, which may be specified by a user in advance. For example, a user may enter one or more parameters for specifying threshold values or any other parameters. The user may select one or more predetermined errors of a group of multiple errors, which can be identified by the error detector. In this way, it is possible to limit the identification of errors to a specific, well-defined classification. Accordingly, the error detector may indicate only those errors, which are specified or selected in advance. All remaining errors may be not detected or at least not indicated by the error detector. In this way, it is possible to limit the error detection to the specified characterization. Thus, an acquisition of the received first and second signal is only limited to the cases when the specified errors are detected. If the first signal would comprise further errors, these errors would not cause an acquisition of the first and second signal. Since only a signal acquisition is performed for the specified errors, a subsequent analysis of the acquired signals can be focused on signals related with the specified errors. In this way, the analysis of the signals and an identification of a source of failure for the respective error is improved.

In a possible embodiment, the second signal is a signal causing the detected error in the first signal.

For example, the second signal may be a signal of a wire, which is close to the wire for transmitting the first signal. For example, the second signal may be a signal transmitted by a wire, which is parallel to the wire transmitting the first signal. Accordingly, the second signal may influence the first signal by crosstalk or the like.

Furthermore, the second signal may be a further signal transmitted by the device transmitting the first signal, or a signal received by the device transmitting the first signal. In this way, it might be possible to evaluate, whether further signals received or transmitted by such a device may have impact to errors in the first signal. The second signal may be also any other kind of signal, which might have impact to the first signal. For example, the second signal may be a supply voltage to the device transmitting the first signal. The second signal may be also any other kind of signal having impact to the transmission of the first signal. For example, the second signal may be a signal, which has influence with respect to electromagnetic compatibility. In particular, the second signal may be a signal of a transmission line. Alternatively, the second signal may be a wireless signal such as a wireless radio frequency signal.

In a possible embodiment, the signal analyzer comprises an antenna. The antenna may be electrically connected to the second input. The antenna may be further configured to receive a wireless second signal.

As already mentioned above, the second signal is not limited to wired signals. Furthermore, electromagnetic signals such as signals having influence to the electromagnetic compatibility, may be analyzed in order to identify a source of failures for a detected error in the first signal. For this purpose, wireless electromagnetic signals may be received by an appropriate antenna. In particular, the antenna may be a broadband antenna for receiving electromagnetic waves in a wide frequency range. However, it may be also possible to use an antenna having specific characteristics with respect to a frequency range and/or a beam width.

In a possible embodiment, the signal analyzer may comprise an amplifier with an input port and an output port, wherein the input port of the amplifier is connected to an antenna, and the output port is connected to the second input.

The amplifier may amplify the signals received by the antenna. In particular, a bandwidth of the amplifier may be set according to a specific frequency range. For example, the bandwidth of the amplifier may correspond to a bandwidth of the connected antenna. The amplifier may further comprise additional elements such as filters or the like. In this way, it is possible to adapt the bandwidth of an input signal and/or an output signal of the amplifier.

In a possible embodiment, the error detector is configured to detect the predetermined error based on one or more configurable tolerance parameters.

As already mentioned above, it might be possible to specify one or more characteristic for identifying an error. For example, an upper and/or a lower threshold value of a signal level may be defined, timing characteristics may be defined or any other property of the received first signal may be specified. Furthermore, particular properties of the decoded first signal may be defined. For example, a particular protocol may be selected. Furthermore, any kind of characteristic in the decoded data sequence may be specified in order to compare the specified properties with the properties of the first signal/the decoded first signal. In this way, the identification of a specific error may be limited to desired well-defined characteristics.

In a possible embodiment, the signal analyzer comprises a display. The display is configured to display the acquired first signal and the acquired second signal. In particular, the first signal and the second signal are displayed in a time aligned manner.

For example, the display may provide signal waveforms of the acquired first signal and the acquired second signal. The signal waveforms may be provided on the display, for example, in a manner as already known from an oscilloscope or the like. The display may provide further options such as zooming in horizontal and/or vertical direction, providing additional information such as a signal value on a selected position, or any other appropriate operation for evaluating the acquired signals. However, it is understood that it may be also possible to provide the acquired signals to a further device, for example a computer or the like in order to evaluate the acquired signals by means of this additional device.

In a possible embodiment, the display is configured to display an indication for specifying the detected error.

For example, a horizontal line in form of a cursor or the like may be displayed for indicating the position when the respective error has been detected. However, any other manner for indicating the position of the error may be possible, too. For example, a color of the displayed signal waveform may change, an error may be displayed by indicating the respective position, etc. Furthermore, it may be possible to provide an indication such as a symbol or a text for specifying the detected error in more detail.

Additionally, in case that the detected error may relate to an error in the decoded first signal, the respective decoded data may be also provided on the display. Especially, it may be possible to indicate the detected error in any appropriate manner.

In a possible embodiment, the acquisition device is configured to acquire the signal sequences with a pre-trigger time. The pre-trigger time may be set according to a predetermined property of a protocol, which is applied to the first signal.

By applying a pre-trigger time, it is possible to acquire signal sequences of a period of time before an error has been detected. For example, the first and the second signal may be continuously stored in a memory, in particular in a cyclic memory. When detecting an error, the acquired signal data relating to a specific period of time may be stored, for example, by transferring the acquired data of the first and the second signal to a further memory or by preventing a further overwriting of the respective data. In this way, it is possible to obtain information of the first and the second signal relating to a period of time before an error has been detected. Furthermore, it may be also possible to acquire the first and the second signal for a specific period of time after the error has been detected.

In particular, the pre-trigger time, i.e. the time period before the detected error has been detected, may be set depending on properties of a protocol, which is applied to the first signal. For example, the pre-trigger time may relate to a specific data block of a protocol, a specific segment of a data block or any other property of the respective protocol. However, it is understood, that the pre-trigger time may be set based on any other scheme, or may be set manually by a user.

In a possible embodiment, the protocol may relate to a protocol of a serial or parallel interface. In particular, the protocol may be a Universal Asynchronous Receiver Transmitter (UART), Control Area Network (CAN), Ethernet, Serial AT Attachment (SATA), Peripheral Component Interconnect (PCI), Peripheral Component Interconnect Express (PCIe) or Universal Serial Bus (USB). However, it is understood, that any other protocol for transmitting data by a serial or parallel interface may be also taken into account.

In a possible embodiment, the signal analyzer may comprise a Field-Programmable Gate Area (FPGA) or an Application Specific Integrated Circuit (ASIC). The FPGA or ASIC may include at least one of the digitizer, the decoder, the error detector and the acquisition device.

By using a FPGA or ASIC for the respective features, an efficient, small sized processing of the error detection and the signal acquisition can be achieved.

In particular, the FPGA or ASIC can process the respective signals in real time.

With the present invention it is therefore possible to provide a versatile and efficient signal analysis of signals transmitting data. In particular, it is possible to define user-specific parameters for identifying one or more errors in a signal. In this way, the identification of errors in the signal may be limited to well-defined user-specific requirements, and reminding errors may be omitted. Accordingly, only signals relating to the user-specific definitions of an error are acquired. In this way, the error analysis can be simplified and improved. Further to this, the present invention ac-quires additional signals in association with an error affected signal. Thus, additional signals which may cause an error, are acquired together with the erroneous signal. Accordingly, external sources of failures can be easily identified.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

The appended drawings are intended to provide further understanding of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown in scale.

In the drawings, same, functionally equivalent and identical operating elements, features and components are provided with same reference signs in each case, unless stated otherwise.

DETAILED DESCRIPTION OF THE DRAWINGS

Figure 1:
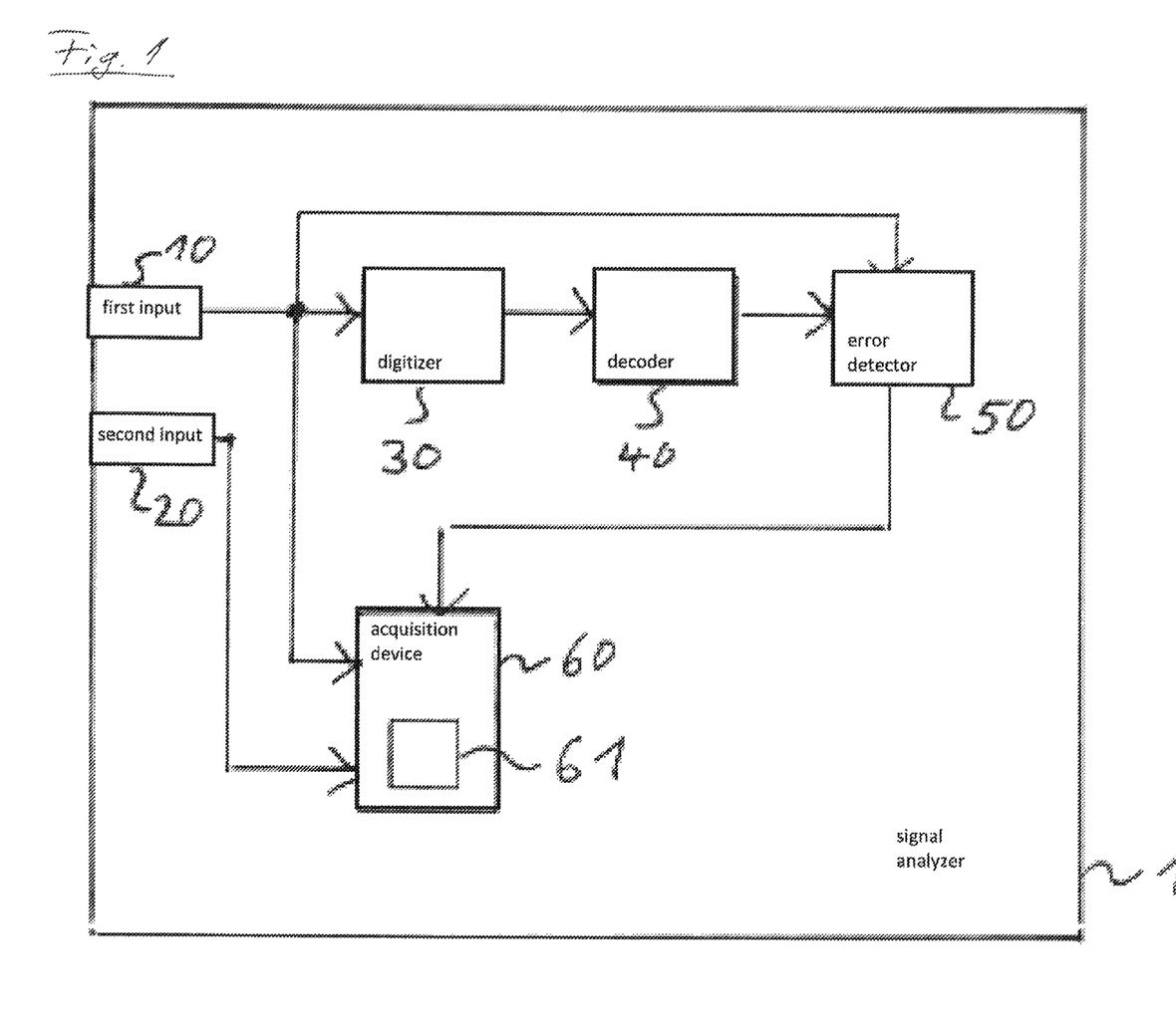
FIG. 1: shows a schematic block diagram of a signal analyzer according to an embodiment.

FIG. 1 shows a schematic block diagram of a signal analyzer 1 according to an embodiment. The signal analyzer comprises a first input 10 and a second input 20. Further, the signal analyzer comprises a digitizer 30, a decoder 40 and an error detector 50. Additionally, the signal analyzer comprises an acquisition device 60.

First input 10 may receive a first signal. The first signal may be a signal for transmitting data. For example, the first signal may be a signal of a serial data communication. The first signal may be a signal transmitted by a single wire with respect to a common ground. The first signal may be a differential signal based on a differential voltage between two wires. The first signal may comprise a single signal or multiple signals of a parallel data transmission. In case the first signal is provided to the first input 10 by a wired connection, the first input may comprise an appropriate input port. In particular, the first input may comprise a connector for connecting the one or more wires for transmitting the first signal.

The first input 10 may further comprise elements such as a resistor for providing an appropriate impedance, filter elements, an amplifier or an attenuator or any other kind of element for adapting the received first signal provided at the first input 10.

Second input 20 may receive a further, second signal. For this purpose, second input 20 may have a same or similar configuration as first input 10. Second input 20 may also comprise a terminal for connecting one or more wires. Second input 20 may receive any number of one or more second signals.

The one or more second signals, which may be received by the second input 20 may relate to signals having impact to the first signal received by the first input 10. For example, the second signal may be a signal, which may cause crosstalk between the signal line transmitting the first signal and the signal line transmitting the second signal. The second signal may be further any kind of signal, which is also transmitted by a device transmitting the first signal, or a signal, which is received by the device transmitting the first signal. The second signal may be also any kind of signal which may cause interferences to the signal line transmitting the first signal or the device which transmits the first signal. The secand signal may be even a wireless signal, for example a radio frequency signal. Furthermore, the second signal may relate, for example, to a supply voltage of the device transmitting the first signal. However, any other kind of signal which may cause interferences, in particular, which may cause an error in the first signal, may be possible.

The received first signal may be provided from the first input 10 to digitizer 30. Digitizer 30 may convert the received first input signal to a digital signal. For example, a signal level below a predetermined threshold may be considered to be a logical low (corresponding to a zero value) and a signal level higher than the threshold may be considered as a logical high (corresponding to a logical one). However, it is understood, that any other scheme for converting the received first input signal to a digital signal may be possible, too. The digitized first signal may be forwarded to decoder 40. Decoder 40 may decode the digital signals provided by digitizer 30. For example, decoder 40 may convert the digital signals to data according to a predetermined protocol. For this purpose, decoder 40 may generate a data stream comprising a sequence of bytes. In particular, decoder 40 may take into account an appropriate transmission protocol comprising, for example, one or more headers, a specific size of data blocks, a position of one or more checksum values, parity bits etc. However, the decoding is not limited to the before-mentioned examples. Furthermore, any other kind of decoding may be also applied by decoder 40.

The decoded data may be provided from decoder 40 to error detector 50. In addition, error detector 50 may receive the first input signal from the first input 10. Error detector 50 may verify the received first input signal and/or the decoded first signal in order to detect one or more errors. For example, it may be possible to specify one or more parameters, and the error detector 50 may verify the first signal and/or the digitized first signal in view of the specified parameters.

Error detector 50 may analyze, for instance, a level of the received first signal. For example, error detector 50 may verify whether or not the level of the received first signal is within predetermined tolerances. For this purpose, it may be possible to specify lower and upper limits for a signal level relating to a logical low and signal level relating to a logical high. Furthermore, it may be possible to specify parameters with respect to rising and falling edges, to a timing of a signal, for example a timing with respect to a clock signal. However, any other criteria for specifying limits which have to be fulfilled may be possible, too.

Error detector 50 may further analyze the decoded first signal in order to identify one or more specific errors in the decoded signal. For example, a bit error may be detected. If the signal comprises one or more parity bits, it may be possible to verify, whether the parity of the signal is correct. Furthermore, if a checksum is included in the data transmitted by the first signal, it may be possible to verify the checksum in order to identify an error. It may be further possible to verify any kind of data included in the data transmitted by the first signal. For example, it may be possible to verify, whether a header of the data stream is correct, whether a data block comprises a correct number of data elements, etc. It is understood that any kind of analysis may be performed in order to identify one or more specific errors in the decoded first signal.

In particular, it may be possible that error detector 50 detects only specific predetermined errors, while other possible errors, which are not explicitly specified, are not detected or at least not indicated by error detector 50. In other words, error detector 50 may only provide an indication of an error when detecting one or more specific predetermined errors.

When error detector 50 detects a predetermined error, error detector 50 may provide a corresponding indication. In particular, error detector 50 may issue a trigger signal, which may be provided to acquisition device 60.

Acquisition device 60 may receive the received first signal from the first input 10. Acquisition device 60 may further receive the received second signal from second input 20. Acquisition device 60 may receive the signals and continuously record the received signals. For this purpose, acquisition device 60 may comprise analogue-to-digital converters for converting received analogue signals to corresponding digital data sequences. Furthermore, acquisition device 60 may comprise elements such as amplifiers, attenuators, filters including resistors, inductors or capacitors or any other appropriate element for adapting the received signals. Acquisition device 60 may store the digital data corresponding to the received signals in a memory 61. For example, acquisition device 60 may continuously store the digital data corresponding to the received signals in a cyclic manner. Accordingly, data relating to received signal are overwritten after a predetermined period of time. In particular, data are overwritten by newly received data. However, any other scheme for acquiring and storing the data relating to the received signals may be possible.

The acquisition of the data corresponding to the received signals may be triggered by a trigger signal provided by error detector 50. For this purpose, the indication of a predetermined error provided by error detector 50 may be used as a trigger signal for triggering the data acquisition by acquisition device 60. For example, the recording of the data in the above described cyclic manner may be stopped when a trigger signal corresponding to a detected error is received by acquisition device 60. However, it may be also possible that the recording of the first and the second signal is continued for a predetermined period of time after an error is detected and the respective trigger signal has been issued by error detector 50. Furthermore, any other kind of data acquisition with respect to the trigger according to the detected error may be possible, too.

The pre-trigger, i.e. the time period, which is recorded before a trigger event is detected, may be set manually by a user. However, it may be also possible that the time period of the pre-trigger is set dynamically based on an appropriate parameter. For example, one or more specific properties of a protocol which is applied to the data transmission of the first signal may be taken into account for setting the period of time of the pre-trigger. For example, the pre-trigger may be set according to a block length of a data block transmitted by the first signal. However, any other manner for determining the length of the pre-trigger, in particular any other property of the protocol applied to the data transmission in the first signal, may be possible, too.

Accordingly, when error detector 50 detects a specific predetermined error, a sequence of the first signal is recorded, which relates to the detected error. Further to this, one or more additional second signals are also recorded in association with the signal sequence of the first signal. Since the one or more second signals may relate to signals causing the error in the first signal, it may be possible to analyze the cause of a failure, which issues the detected error. Since the detection of an error may be precisely specified, the acquisition of the signals is limited only to such signals, which relate to the specified time of error. In this way, the amount of data, which have to be analyzed can be minimized and thus, the analysis and the detection of the source for the respective error is simplified and accelerated.

Figure 2:
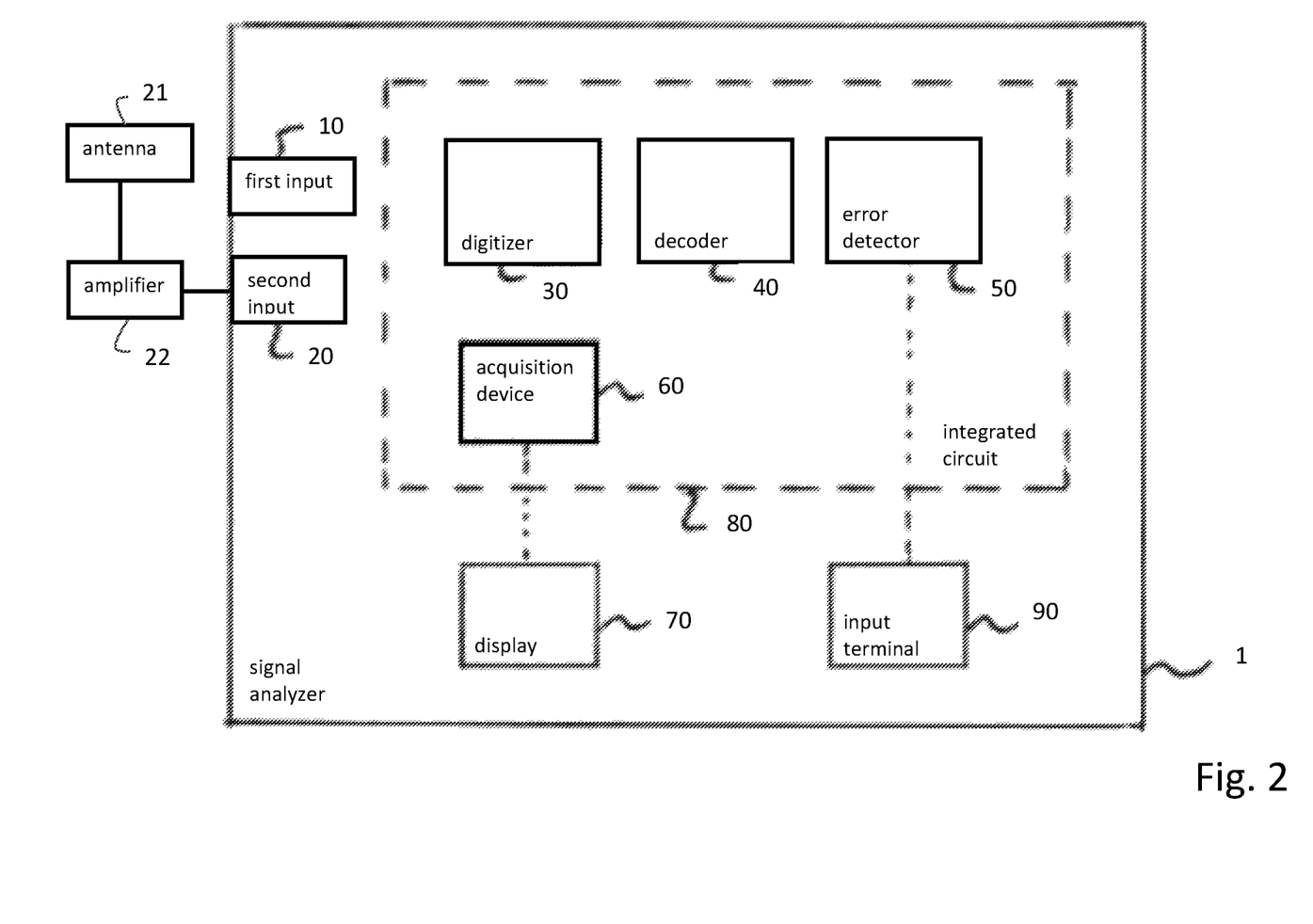
FIG. 2: shows a schematic block diagram of a signal analyzer according to further embodiment.

FIG. 2 shows a schematic block diagram of an embodiment of a signal analyzer 1. The signal analyzer 1 according to FIG. 2 may comprise the elements, which have been described already before in connection with FIG. 1. Thus, the explanation above in connection with FIG. 1 also applies to the signal analyzer 1 according to FIG. 2.

The received signals, in particular the received second signal may be not limited only to signals provided by a wired connection. Moreover, it may be also possible to receive and acquire wireless signals. For this purpose, an antenna 21 may be provided for receiving wireless signals such as electromagnetic radio frequency signals. Antenna 21 may be connected with an input of a signal analyzer 1, for example with the second input 20 of signal analyzer 1. In this way, the wireless received signals may be provided to an input terminal of the second input 20. In addition, an amplifier 22 may receive the output of antenna 21. The amplifier may amplify the signals provided by antenna 21 at the input port of amplifier 20, and the amplified signal may be provided by an output port of amplifier 22 to the second input 22.

Even though not shown in detail in FIG. 2, it may be also possible that the first signal may relate to a wireless signal, which is received by an antenna connected to first input 10.

Acquisition device 1 may comprise an integrated circuit 80 such as a field-programmable gate array (FPGA) or an application-specific integrated circuit (ASIC). Accordingly, one or more elements such as the digitizer 30, the decoder 40, the error detector 50 and/or the acquisition device 60 may be realized by such an integrated circuit. In particular, the integrated circuit 80 may perform the respective operations in real time.

The operation of signal analyzer 1, in particular the specification of the parameters for the error detections of error detector 50 may be configured by an input terminal 90. For example, input terminal 90 may be a panel or a touch-screen. However, any other kind of input terminal may be possible, too.

The results of the signal acquisition may be provided, for example, by a display 70. Display 70 may be any kind of appropriate display, for example a TFT display, an OLED display or the like. In particular, display 70 and input device 90 may be combined by a touch-screen.

Display 70 may provide the acquired signal sequences of the first signal and the second signal in any appropriate manner. For example, the signal sequences may be provided as signal waveforms. The signal sequences of the acquired first signal and the acquired second signal may be displayed in a time-aligned manner. Accordingly, the signal waveforms may be displayed in an arrangement wherein the individual signal waveforms are displayed with a common time axis. Furthermore, additional information, for example information regarding the decoded data of the first signal may be also provided on the display 70. In addition, it may be possible to provide an indication for indicating the position of the detected error in the displayed signal sequences. Furthermore, it may be possible to provide a cursor, which can be moved around in the displayed signals. For example, values of the displayed signals at the position of the cursor may be also provided. However, it is understood, that any other feature may be also provided by the display 70 when displaying the acquired signals.

Figure 3:
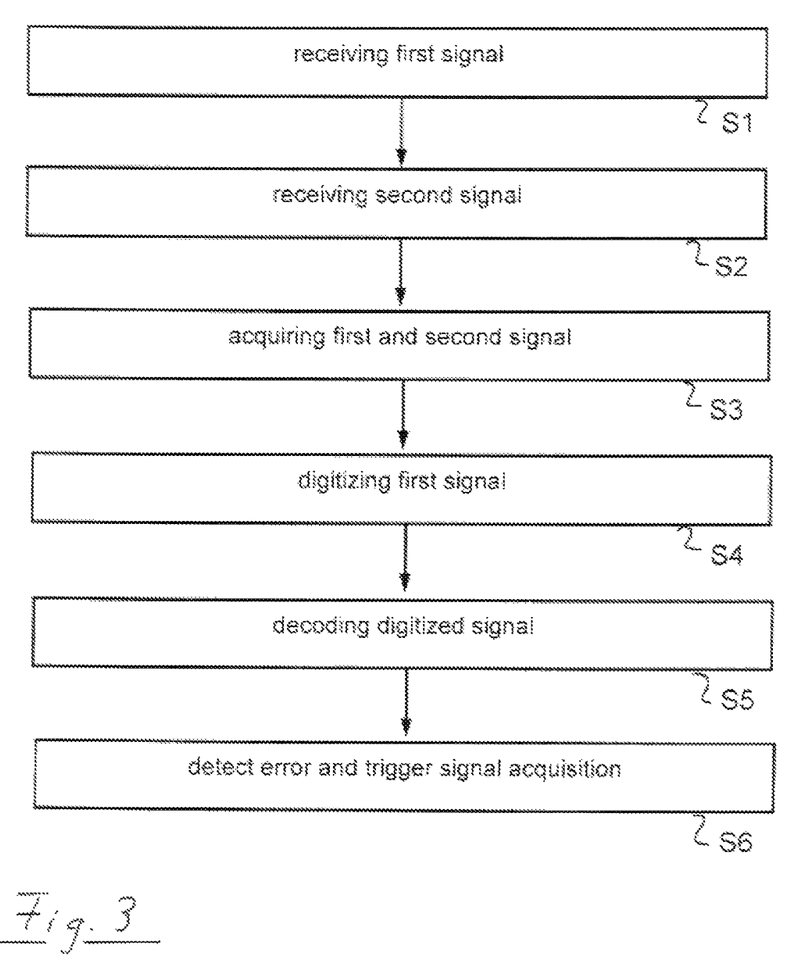
FIG. 3: shows a flow diagram of a method for analyzing signals according to an embodiment.

FIG. 3 shows a flow diagram illustrating a method for analyzing signals according to an embodiment. In particular, the illustrated method may perform any kind of operation, which has been already described above in connection with signal analyzer 1. Furthermore, the signal analyzer 1, which has been described before, may comprise any kind of device for performing an operation as will be described below in connection with the method.

In a step S1, a first signal may be received. The first signal may be received by a first input 10. In step S2, a second signal may be received. The second signal may be received by a second input 20.

In step S3, signal sequences of the received first signal and the received second signal may be acquired. In particular, the signal sequences may be acquired by an acquisition device 60.

In step S4, the received first signal may be digitized. In particular, the first signal may be digitized by a digitizer 30. Subsequently, the digitized signal may be decoded. In particular, the signal may be decoded by a decoder 40.

In step S6, a predetermined error may be detected in the received first signal and/or the decoded first signal. The detection of the error may be performed by an error detector 50.

Based on the detected error, the signal acquisition for acquiring the first and the second signal may be based on the detected error.

The second signal may be one or more signals, which may cause an error, e.g. the detected error in the received first signal.

The second signal may comprise a signal for testing electromagnetic compatibility, a power line signal or any kind of signal related with the first signal.

The predetermined errors may comprise at least one of a protocol error, a bit error, a timing error or a level error in the received first signal or the detected digitized signal.

The predetermined error may be detected based on one or more configurable tolerance parameters.

In particular, the second signal may be a wireless signal, which is received by an antenna. Accordingly, the antenna may provide the received wireless signal to the second input 20.

The acquisition of the signals may further comprise acquiring signal sequences with a pre-trigger time, and setting the pre-trigger time according to a predetermined property of a protocol which is applied to the first signal.

The protocol may comprise a protocol of a serial or parallel interface. For example, the protocol may relate to Universal Asynchronous Receiver Transmitter (UART), Control Area Network (CAN), Ethernet, Serial AT Attachment (SATA), Peripheral Component Interconnect (PCI), Peripheral Component Interconnect Express (PCIe) or Universal Serial Bus (USB).

The acquisition of signal sequences, the digitizing of the received signals, the decoding of the digitized first signal and/or the detection of a predetermined error may be performed by a field-programmable gate area (SPCA) or an Application-Specific Integrated Circuit (ASIC).

Summarizing, the present invention relates to an analysis of a signal, in particular a signal for transmitting data. For analyzing the signal transmission and detecting a specific error, a data signal may be received and analyzed in order to detect one or more types of errors according to predetermined specifications. When such a predetermined error is detected, the signal for transmitting the data and one or more further signals, which may cause the error are acquired. Accordingly, a cause of failure may be easily analyzed based on the acquired signal sequences of the signal for transmitting the data and the additionally acquired signals.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

LIST OF REFERENCE SIGNS 1 signal analyzer
10 first input
20 second input
21 antenna
22 amplifier
30 digitizer
40 decoder
50 detector
60 acquisition device
70 display
80 integrated circuit
90 input terminal

The invention claimed is:

1. A signal analyzer, comprising:
an input terminal for specifying one or more predetermined errors out of a group of specific errors;
a first input for receiving and providing a first signal;
a second input for receiving and providing a second signal;
an acquisition device for acquiring a signal sequence of the received first signal and a signal sequence of the received second signal;
a digitizer for digitizing the received first signal;
a decoder for decoding the digitized first signal; and
an error detector for detecting an error out of the one or more specified predetermined errors in the received first signal and/or in the decoded digitized first signal;
wherein a signal acquisition of the acquisition device is only triggered based on the detection of an error out of the one or more specified predetermined errors by the error detector.

2. The signal analyzer of claim 1, wherein the received second signal is a signal causing the detected error in the first signal.

3. The signal analyzer of claim 1, wherein the received second signal comprises a signal for testing electromagnetic compatibility, a power line signal or a signal related with the first signal.

4. The signal analyzer of claim 1, wherein the group of specific errors comprises at least one of a protocol error, a bit error, a timing error and a level error in the received first signal or the decoded digitized first signal.

5. The signal analyzer of claim 1, wherein the error detector is configured to detect the one or more specified more predetermined errors based on one or more configurable tolerance parameters.

6. The signal analyzer of claim 1, comprising an antenna, wherein the antenna is electrically connected to the second input, and the antenna is configured to receive a wireless second signal.

7. The signal analyzer of claim 6, comprising an amplifier with an input port and an output port, wherein the input port of the amplifier is connected to the antenna, and the output port is connected to the second input.

8. The signal analyzer of claim 1, comprising a display for displaying the acquired first signal and the acquired second signal, wherein the acquired first signal and the acquired second signal are displayed in a time-aligned manner.

9. The signal analyzer of claim 8, wherein the display is configured to display an indication for specifying the detected error.

10. The signal analyzer of claim 1, wherein the acquisition device is configured to acquire the signal sequences with a pre-trigger time, and to set the pre-trigger time according to a predetermined property of a protocol which is applied to the received first signal.

11. The signal analyzer of claim 10, wherein the protocol comprises a protocol of a serial or a parallel interface, in particular Universal Asynchronous Receiver Transmitter (UART), Controller Area Network (CAN), Ethernet, Serial AT Attachment (SATA), Peripheral Component Interconnect (PCI), Peripheral Component Interconnect Express (PCIe) or Universal Serial Bus (USB).

12. The signal analyzer of claim 1, comprising a field programmable gate array or an application-specific integrated circuit including at least one of the digitizer, the decoder, the error detector and the acquisition device.

13. A method for analyzing signals, comprising:
specifying, by an input terminal, one or more predetermined errors out of a group of specific errors;
receiving and preoviding a first signal by a first input;
receiving and providing a second signal by a second input;
acquiring a signal sequence of the received first signal and a signal sequence of the received second signal by an acquisition device;
digitizing the received first signal;
decoding the digitized first signal by a decoder; and
detecting an one or more specified predetermined errors in the received first signal and/or in the decoded digitized first signal by an error detector;
wherein the acquiring of the signal sequence is only triggered based on the detection of an error out of the one or more specified predetermined errors by the error detector.

14. The method of claim 13, wherein the second signal is a signal causing the detected error in the first signal.

15. The method of claim 13, wherein the received second signal comprises a signal for testing electromagnetic compatibility, a power line signal or a signal related with the first signal.

16. The method of claim 13, wherein the one or more specified predetermined errors comprise at least one of a protocol error, a bit error, a timing error and a level error in the received first signal or the decoded digitized first signal.

17. The method of claim 13, wherein the one or more specified predetermined errors are detected based on one or more configurable tolerance parameters.

18. The method of claim 13, comprising:
    receiving a wireless second signal by an antenna, and
    providing the received wireless signal to the second input.

19. The method of claim 18, wherein the received wireless signal is amplified by an amplifier, and the amplified signal is provided to the second input.

20. The method of claim 13, comprising displaying the acquired first signal and the acquired second signal on a display, wherein the acquired first signal and the acquired second signal are displayed in a time aligned manner.

21. The method of claim 20, comprising displaying an indication for specifying the detected error.

22. The method of claim 13, wherein the acquisition of the signals comprises:
    acquiring the signal sequences with a pre-trigger time, and
    setting the pre-trigger time according to a predetermined property of a protocol which is applied to the received first signal.

23. The method of claim 22, wherein the protocol comprises a protocol of a serial or a parallel interface, in particular Universal Asynchronous Receiver Transmitter (UART), Controller Area Network (CAN), Ethernet, Serial AT Attachment (SATA), Peripheral Component Interconnect (PCI), Peripheral Component Interconnect Express (PCIe) or Universal Serial Bus (USB).

24. The method of claim 13, wherein acquiring the signal sequences, digitizing the received signals, decoding the digitized first signal and detecting the one or more predetermined errors are performed by a field programmable gate array or an application-specific integrated circuit.

* * * * *